United States Patent
Yamada et al.

(10) Patent No.: US 6,340,436 B1
(45) Date of Patent: Jan. 22, 2002

(54) PHOSPHOR, AND RADIATION DETECTOR AND X-RAY CT UNIT EACH EQUIPPED THEREWITH

(75) Inventors: Hiromichi Yamada, Tokyo; Ichiro Miura, Chiba-ken; Motomichi Doi; Osamu Miyazaki, both of Ibaraki-ken; Minoru Yoshida, Tokyo, all of (JP)

(73) Assignee: Hitachi Medical Corporation (JP)

( * ) Notice: Subject to any disclaimer, the term of this patent is extended or adjusted under 35 U.S.C. 154(b) by 0 days.

(21) Appl. No.: 09/462,321
(22) PCT Filed: Jul. 8, 1998
(86) PCT No.: PCT/JP98/03063
§ 371 Date: Mar. 7, 2000
§ 102(e) Date: Mar. 7, 2000
(87) PCT Pub. No.: WO99/02622
PCT Pub. Date: Jan. 21, 1999

(30) Foreign Application Priority Data

Jul. 8, 1997 (JP) ............................................. 9-182221

(51) Int. Cl.⁷ .......................... C09K 11/86; C09K 11/08; G01T 1/20; A61B 6/03
(52) U.S. Cl. ............................. 252/301.45; 250/483.1; 250/483.4; 378/6
(58) Field of Search .................... 252/301.45; 250/483.1, 250/483.4; 378/6

(56) References Cited

U.S. PATENT DOCUMENTS 4,442,360 A * 4/1984 Susuki et al. .......... 252/301.4 S
4,510,414 A * 4/1985 Fujino et al. .......... 252/301.4 S
4,733,088 A * 3/1988 Yamada et al. ........ 252/301.4 S
5,296,163 A * 3/1994 Leppert et al. ........ 252/301.4 S

FOREIGN PATENT DOCUMENTS

| JP | 47-13243 | 4/1972 |
| JP | 59-38280 | 10/1977 |
| JP | 60-4856 | 11/1981 |
| JP | 64-38491 | 2/1989 |

* cited by examiner

Primary Examiner—C. Melissa Koslow
(74) Attorney, Agent, or Firm—Pennie & Edmonds LLP

(57) ABSTRACT

A phosphor represented by the general formula $$(L_{1-x-y-z-d}Eu_xCe_zM'_d)_2O_2S$$

(wherein L is at least one element selected from the group consisting of Gd, La and Y, M is at least one element selected from the group consisting of Tb and Pr, M' is at least one element selected from the group consisting of Ca, Sr and Zn, and x, y, z and d are values falling in the ranges of $0.001 \leq x \leq 0.06$, $0 < y \leq 12 \times 10^{-5}$, $0 < z \leq 12 \times 10^{-5}$, and $0 \leq d \leq 2.5 \times 10^{-4}$) and manufactured by the hot hydrostatic pressing method. The phosphor has a high light permeability, a high luminous efficacy and a reduced afterglow. A radiation detector comprising a combination of this phosphor with silicon photodiode has an excellent wave length matching capability, is capable of obtaining a high luminous output, and is suitably used as an X-ray detector of an X-ray CT unit or the like.

15 Claims, 7 Drawing Sheets

15

PHOSPHOR, AND RADIATION DETECTOR AND X-RAY CT UNIT EACH EQUIPPED THEREWITH

BACKGROUND OF THE INVENTION

The present invention relates to a rare-earth element oxysulfide phosphor suitable for use in a radiation detector for detecting X-rays, γ rays and the like and particularly for use in the radiation detector of an X-ray CT apparatus, a positron camera or the like. The present invention also relates to a radiation detector and an X-ray CT apparatus using the phosphor.

As the radiation detectors used in X-ray CT apparatuses and the like there have conventionally been used ones combining a xenon gas chamber or BGO (bismuth germanium oxide) single crystal and a photomultiplier tube or combining CsI:T1 single crystal or $CdWO_4$ single crystal and a photodiode. In recent years, however, rare-earth-system phosphors with high radiation-to-light conversion efficiencies have been developed as scintillators and radiation detectors combining such a phosphor with a photodiode have been put into practical use.

Rare-earth phosphors include rare-earth element oxide phosphors having a matrix mainly of $L_2O_3$ (L representing an element such as Y or Gd) and containing a small amount of activator (Japanese Unexamined Patent Publication No. 64 (1989)-38491, for example) and rare-earth element oxysulfides having a matrix of $L_2O_2S$ and containing a small amount of activator. Although the former phosphors can be produced as ones of cubic crystal system and therefore have the advantage of excellent transparency, they have the drawback of being inferior to the latter phosphors in luminous efficiency.

In contrast, rare-earth element oxysulfide phosphors are high in luminous efficiency. Japanese Patent Publication No. 60(1985)-4856, for example, teaches $Gd_2O_2S$:Pr, Ce, F and Japanese Patent PublicationNo. 59(1984)-38280 teaches (Y, Gd, La or $Lu)_2O_2S$:Tb, Ce. The emission peaks of these phosphors differ depending on the activator. A phosphor using Pr as activator emits green light and a phosphor using Tb as activator emits blue or green light. Phosphors using Eu as activator emit red light and are used as color TV phosphors (Japanese Patent Publication No. 47(1972)-13243).

Properties generally required of a scintillator material used in a radiation detector include short afterglow, high emission efficiency, high X-ray stopping power and chemical stability. Large afterglow is particularly a problem in X-ray CT applications, for example, because it makes information-carrying signals indistinct in the time-axis direction. Very small afterglow is therefore required.

Phosphor afterglow generally includes primary afterglow and secondary afterglow (long-afterglow component). The primary afterglow has a relatively short attenuation period (less than around 2 ms) but the secondary afterglow has a longer attenuation period that is particularly undesirable when the phosphor is used as a scintillator. When the secondary afterglow is large, information-carrying signals become indistinct in the time-axis direction. Secondary afterglow is thought to be caused by the contribution to emission of electrons and holes thermally released from traps formed by phosphor lattice defects. It can be reduced by reducing the number of defects becoming shallow traps or by adding another additive that essentially reduces the action of the shallow traps.

For example, in the case of the rare-earth element oxysulfide phosphor taught by Japanese Patent Publication No. 60(1985)-4856, whose luminous component is Pr, a phosphor capable of utilization as an X-ray CT scintillator is obtained by addition of Ce.

For medical diagnosis applications, however, a detector of still higher detector efficiency is desired in order to minimize the radiation dosage received by the human body while still securing excellent detector efficiency and high SN ratio. In addition, phosphors that use Pr or Tb activators have a problem of low overall detection efficiency of the radiation detector, despite high emission efficiency and short afterglow, since they emit blue or green light and therefore have poor wavelength matching with PIN photodiodes currently used as photodetectors in radiation detectors employed in X-ray CT and the like, owing to the fact that the PIN photodiode's peak response wavelength is in the red region.

An object of the present invention is therefore to overcome these problems of the prior art and to provide a phosphor with very short afterglow and high emission efficiency that is particularly useful as a scintillator in X-ray CT and the like. Another object of the present invention is to provide a radiation detector that exhibits excellent wavelength matching between the phosphor and the photodetector and is high in detection efficiency (luminous output). Another object of the present invention is to provide an X-ray CT apparatus that is equipped with a radiation detector with very small afterglow and high emission efficiency as a radiation detector and can provide high-resolution, high-quality tomographic images.

DISCLOSURE OF THE INVENTION

In order to achieve the foregoing objects, the inventors conducted an intense study regarding rare-earth element oxysulfide phosphors having Eu as the luminous component and, discovering as a result that a phosphor of high emission efficiency and greatly reduced secondary afterglow is obtained by adding prescribed components, they arrived at present invention.

Specifically, the phosphor of the present invention is a phosphor represented by the general formula

$$(L_{1-x-y-z-d}Eu_xM_yCe_zM'_d)_2O_2S$$

where L is at least one element selected from the group consisting of Gd, La and Y, M is at least one element selected from the group consisting of Tb and Pr, and M' is at least one element selected from the group consisting of Ca, Sr and Zn. In addition, x, y, z and d are values falling in the ranges of $0.001 \leq x \leq 0.06$, $0 < y \leq 12 \times 10^{-5}$, $0 < z \leq 12 \times 10^{-5}$, and $0 \leq d \leq 2.5 \times 10^{-4}$.

This phosphor is a rare-earth element oxysulfide phosphor having a matrix of $L_2O_2S$ and containing Eu activator component. It absorbs radiation such as X-rays, gamma rays and nuclear radiation, exhibits Eu emission having peaks straddling 600nm, and exhibits numerous line emissions in the range of 450–700nm. When such a phosphor is used as the scintillator of a radiation detector, matching with the photodiode is extremely good and a luminous output can be obtained that is twice or more than that of the $CdWO_4$ currently widely used as a scintillator for X-ray CT.

Any of Gd, La and Y can be used as the element L. Although two or more of these elements can be used, the X-ray stopping power can be maximized by replacing the L position totally with Gd. The emission characteristics remain substantially the same, however, even if part of the Gd is replaced with La or Y.

Eu is an element that serves as an activator (luminous component) in the phosphor of the present invention. The Eu content for generating Eu emission (x:number of moles replacing 1 mole of element L) is preferably 0.001 or greater. The Eu content x is defined as 0.06 or less for applications requiring high luminous output because a luminous output twice that of $CdWO_4$ cannot be obtained when the Eu content x exceeds 0.06. More preferably, the Eu content x is defined as 0.002–0.03. About 2.5 times the luminous output of $CdWO_4$ can be obtained in this range.

Element M and Ce lower the afterglow of the phosphor of the present invention. As pointed out earlier, it is thought that shallow traps produced by phosphor lattice defects contribute to secondary afterglow and that afterglow can reduced by adding another additive that essentially reduces the action of the shallow traps. The inventors found through their research that element M and Ce are elements capable of effectively reducing secondary afterglow in a rare-earth element oxysulfide using Eu as activator.

Either Tb or Pr can be used as the element M and part of Tb can be replaced by Pr. As no effect of reducing afterglow can be obtained with only one of element M and Ce, however, at least one member of element M and Ce are included.

Afterglow reduction effect can be obtained even with very small contents of both element M and Ce. Although increasing M content y and Ce content z proportionally reduces afterglow, it also tends to lower scintillator luminous output. Preferably, therefore, the content of each should not exceed $12 \times 10^{-5}$ in applications requiring high luminous output. When these elements are included within this range, a luminous output can be obtained that is twice or more than that of the $CdWO_4$ and, moreover, afterglow can be reduced to a small fraction of that in the case where only Eu is contained or only Eu and Ce or Eu and M are contained.

While M' is not an indispensable element in the phosphor of the present invention, Eu emission can be increased by addition of element M'. One or more of Ca, Sr and Zn can be used as the element M' for increasing Eu emission. Among these elements, Ca is particularly preferable for its effect of enhancing Eu emission by up to a maximum of 7%. The foregoing effect of the element M' can be obtained at a content up to $2.5 \times 10^{-4}$. Particularly at a content in the range of $0.3 \times 10^{-4}$–$2.0 \times 10^{-4}$, emission can be improved by around 3%.

The phosphor of the present invention is not particularly limited with regard to crystal morphology. The process for producing other phosphors as single crystal reported in J. Appl. Phys., vol. 42, p3049 (1971) can be applied as the process for preparing the phosphor of the present invention as single crystal.

Since the phosphor of the present invention is a rare-earth element oxysulfide, a process that prevents diffusion of sulfur during production must be adopted as the production process. The hot isostatic pressing process (HIP process) is preferable. The HIP process adds a sintering agent to the starting material powder, packs and vacuum-seals the result in a metal container of pure iron or the like, and effects hot isostatic pressing. $Li_2GeF_6$ or the like can be used as the sintering agent. The hot isostatic pressing is conducted for around 30 min to several hours under conditions of a temperature of 900–1,900° C., preferably 1,100–1,400° C., and a pressure of about 900–1,800 atm. This enables the phosphor to be obtained as a dense sintered body of high optical transmittance.

The phosphor before HIP processing can be prepared as follows: mixing $Gd_2O_3$, $Eu_2O_3$, $Na_2CO_3$ and S, for example, to obtain a prescribed composition, adding small amounts of additive elements (Tb (Pr), Ce, Ca etc.) as salts such as nitrates, adding an appropriate flux component, e.g., $K_3PO_4 \cdot 3H_2O$, $Li_2B_4O_7$ or the like, packing the result in an alumina crucible, covering the crucible, and conducting baking at about 1,350° C. for several hours (around $3 \times 10$ hr). The scintillator powder baked in this manner is subjected to the foregoing HIP processing.

As oxygen and sulfur defects are present in the phosphor after HIP, once the phosphor has been cut to the desired shape it is preferably annealed in Ar gas containing a small amount of oxygen at around 1,000° C.–1,300° C. for about 15 min–120 min.

The phosphor produced in this manner is dense, high in optical transmittance, and low in loss of light by scattering. A radiation detector of large luminous output can therefore be obtained.

Although the phosphor of the present invention can be used in intensifying screens, fluorescent screens, scintillators and other general phosphor applications, it is particularly suitable for use in X-ray CT detectors, which require high luminous output and small afterglow.

The radiation detector of the present invention is equipped with a ceramic scintillator and a photodetector for detecting scintillator emission. The phosphor described in the foregoing is used as the ceramic scintillator. A photodiode such as a PIN photodiode or an avalanche photodiode is preferably used as the photodetector. These photodiodes have high sensitivity and short response. Moreover, as they have wavelength sensitivity from the visible light to near infrared region, they are suitable for their good wavelength matching with the phosphor of the present invention.

The X-ray CT apparatus of the present invention is equipped with an X-ray source, an X-ray detector disposed facing the X-ray source, a revolving unit for holding the X-ray source and the X-ray detector and revolving them about the object to be examined, and image reconstruction means for reconstructing a tomographic image of the object based on the intensity of the X-rays detected by the X-ray detector, which CT apparatus uses as the X-ray detector a radiation detector combining the aforesaid phosphor and a photodiode.

High-quality, high-resolution images can be obtained by utilizing this X-ray detector because the high X-ray detection rate makes it possible to achieve an approximate doubling of sensitivity compared with an X-ray CT apparatus using a conventional scintillator (such as $CdWO_4$) and also because its afterglow is extremely small. As the size of the elements can be reduced, moreover, images with high spatial resolution can be obtained. In addition, the X-ray dosage received by the object can be made lower than when using a conventional X-ray CT apparatus.

BEST MODE FOR CARRYING OUT THE INVENTION

The X-ray CT apparatus equipped with the radiation detector of the present invention will now be explained with reference to an embodiment.

Figure 1:
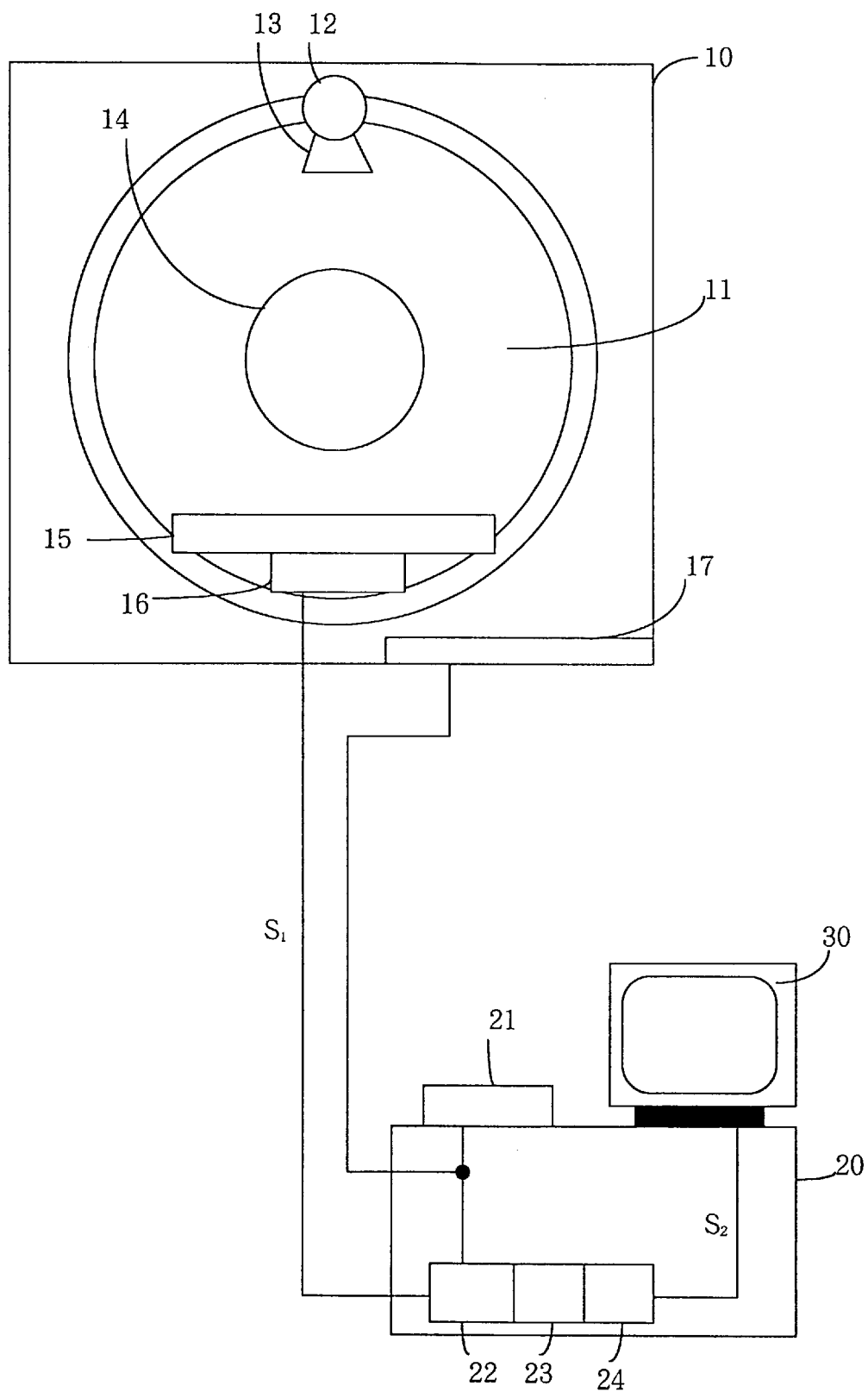
FIG. 1 is a diagram showing the configuration of an X-ray CT apparatus that is an embodiment of the present invention.

FIG. 1 is a schematic view of an X-ray CT apparatus of the present invention. The apparatus comprises a scanner gantry section 10 and an image reconstruction section 20. The scanner gantry section 10 comprises a revolving disk 11 having an open section 14 into which the patient (the object to be examined) is conveyed, an X-ray tube 12 mounted on the revolving disk 11, a collimator 13 attached to the X-ray tube 12 for controlling the direction of the X-ray beam, an X-ray detector 15 mounted on the revolving disk 11 to face the X-ray tube 12, a detector circuit 16 for converting the X-rays detected by the X-ray detector 15 into a prescribed signal, and a scan control circuit 17 for controlling revolution of the revolving disk 11 and the width of the X-ray beam.

The image reconstruction section 20 comprises an input device 21 for inputting the patient's name, date and time of the examination, examination conditions and the like, an image processing circuit 22 for processing measurement data S1 sent from the detector circuit 16 to effect CT image reconstruction, image information adding section 23 for adding to the CT image produced by the image processing circuit 22 the patient's name, date and time of the examination, examination conditions and other information input through the input device 21, and a display circuit 24 for adjusting the display gain of the image-information-added CT image signal S2 and outputting it to a display monitor 30.

X-rays are radiated from the X-ray tube 12 of the X-ray CT apparatus with the patient resting on a table (not shown) installed in the open section 14 of the scanner gantry section 10. The X-rays are imparted directivity by the collimator 13 and are detected by the X-ray detector 15. By revolving the revolving disk 11 around the patient at this time, the X-rays are detected while changing the direction of the X-ray beam. In the case of a full scan, one scan is defined as one rotation (360 degrees) of the revolving disk. The image of one slice is reconstructed from the measurement data for one scan. The tomographic image produced by the image reconstruction section 20 is displayed on the display monitor 30.

Figure 2:
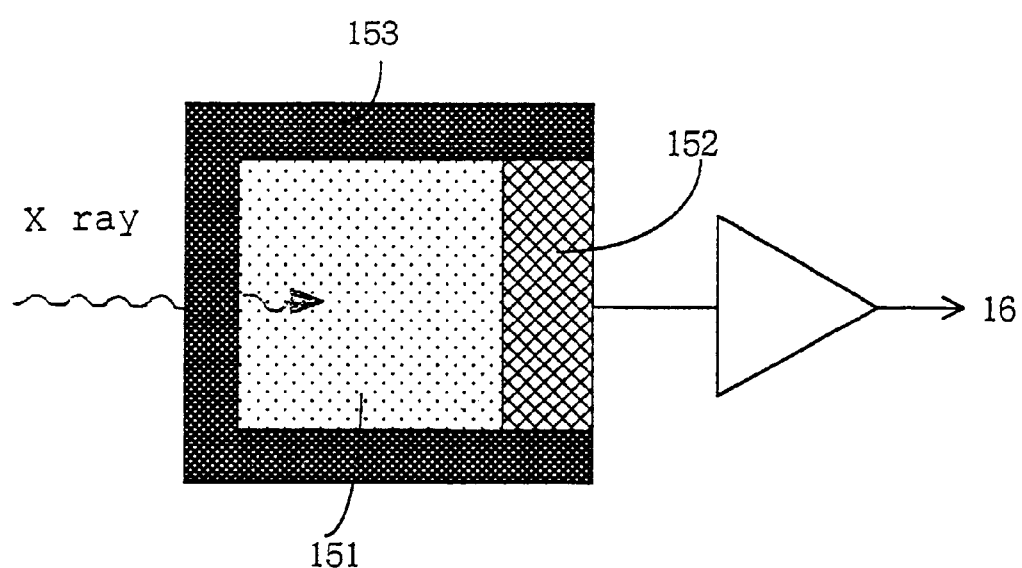
FIG. 2 is a diagram showing the structure of a radiation detector (X-ray detector) that is an embodiment of the present invention.

The X-ray detector 15 has many (e.g., 960) scintillator elements, each a combination of a scintillator and a photodiode, disposed in an arcuate array. As shown in FIG. 2, each scintillator element has a structure combining a scintillator 151 and a PIN photodiode 152, and the p-layer side of the PIN photodiode 152 is connected to the detector circuit 16. The whole element other than the p-layer of the PIN photodiode 152 is covered by a shield 153 to prevent light emitted by the scintillator 151 from escaping to the exterior. The shield 153 is made of a material such as aluminum that passes X-rays and reflects light.

The scintillator 151 is a phosphor that emits light upon absorbing X-rays reaching it from the X-ray tube 12 after passing through the patient. It consists of the phosphor of the present invention, namely, a phosphor that is a rare-earth element oxysulfide having Eu as its activator and that contains Tb (and/or Pr) and Ce as afterglow lowering elements. More particularly, a phosphor produced by the HIP process is used. The scintillator 151 has two or more times the luminous output of conventional scintillators such as $CdWO_4$. Moreover, its emission, which has strong emission peaks straddling 600 nm, overlaps the high-photosensitivity wavelength region of the PIN photodiode 152, so that it is photoelectrically converted by the PIN photodiode 152 with high efficiency.

During the taking of tomographic images with this configuration, the X-ray tube 12 continuously emits a fine beam of X-rays as the X-ray tube executes one revolution about once every 1 second to 4 seconds. During this period, the X-rays passing through the object are detected, with the detector circuit 16 side being turned ON and OFF several hundred times. An X-ray detector 15 with high output and short afterglow is therefore required. As the X-ray CT apparatus of the invention utilizes an X-ray detector 15 with high output and low afterglow, it can provide high-quality CT images. Owing to the high luminous output, moreover, the same image can be obtained with a smaller amount of X-rays, whereby the X-ray dosage received by the patient can be reduced.

Although the foregoing explanation with reference to the drawing was made regarding an X-ray CT apparatus using an X-ray tube, the X-ray source is not limited to an X-ray tube but can instead be a beam-type X-ray device that effects beam scanning.

EXAMPLES

Example 1

$Gd_2O_3$, $Eu_2O_3$, $Tb(NO_3)_3$, $Ce(NO_3)_3$, $Na_2CO_3$ and S were used as raw materials, and they were mixed with flux components, $K_3PO_4 \cdot 3H_2O$ and $Li_2B_4O_7$. The mixture was packed in an alumina crucible, and, after covering the crucible, subjected to baking at 1,350° C. for 5 hours. The baked materials were washed with water to remove the flux components, treated with 0.15 N hydrochloric acid, and then washed with water to obtain scintillator powder.

The scintillator powder obtained in this manner was added 0.1% of $Li_2GeF_6$ as a sintering agent, and packed in a container made of pure iron, and the container was vacuum-sealed. Then, the materials were subjected to hot isostatic pressing under the condition of 1300° C. and 1000 atm. The obtained ceramic scintillator was cut with a thickness of 1.15 mm, and annealed for 30 minutes at 1100° C. in Ar gas containing 10 ppm of oxygen.

According to the method described above, $Gd_{2(1-x-y-z)}O_2S:Eu_x$, $Tb_y$, $Ce_z$ (y=z=4×10$^{-5}$) ceramic scintillators with different Eu concentrations (x) were produced. A detector was produced by using each scintillator together with a photodiode, and placed at a distance of 20 cm from an X-ray source (120 kV, 0.5 mA), and its luminous output was measured.

Figure 3:
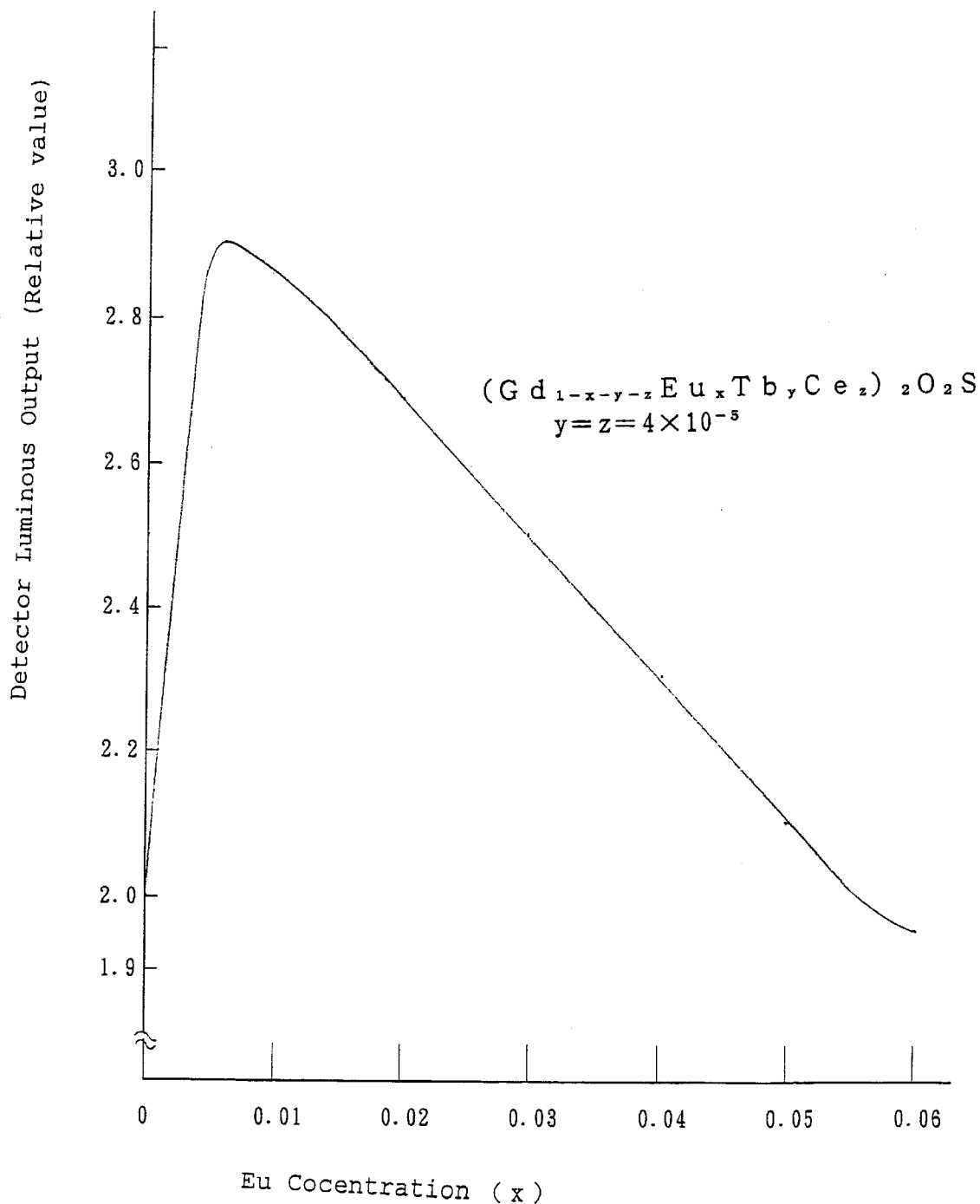
FIG. 3 is a graph showing how detector luminous output varies with Eu concentration (x) in a $(Gd_{0.9992-x}Eu_xTb_yCe_z)_2O_2S$ ($y=z=4 \times 10^{-5}$) phosphor of the present invention.

The results are shown in FIG. 3. The luminous output was represented with relative values based on the luminous output of a $CdWO_4$ detector defined to be 1 (the same shall be applied hereinafter). As clearly seen from the results shown in the figure, luminous output of twice or more that of the $CdWO_4$ detector could be obtained in the range of Eu concentration x of 0.001–0.055, and 2.5 times or more in the range of x of 0.002–0.03.

Example 2

Figure 4:
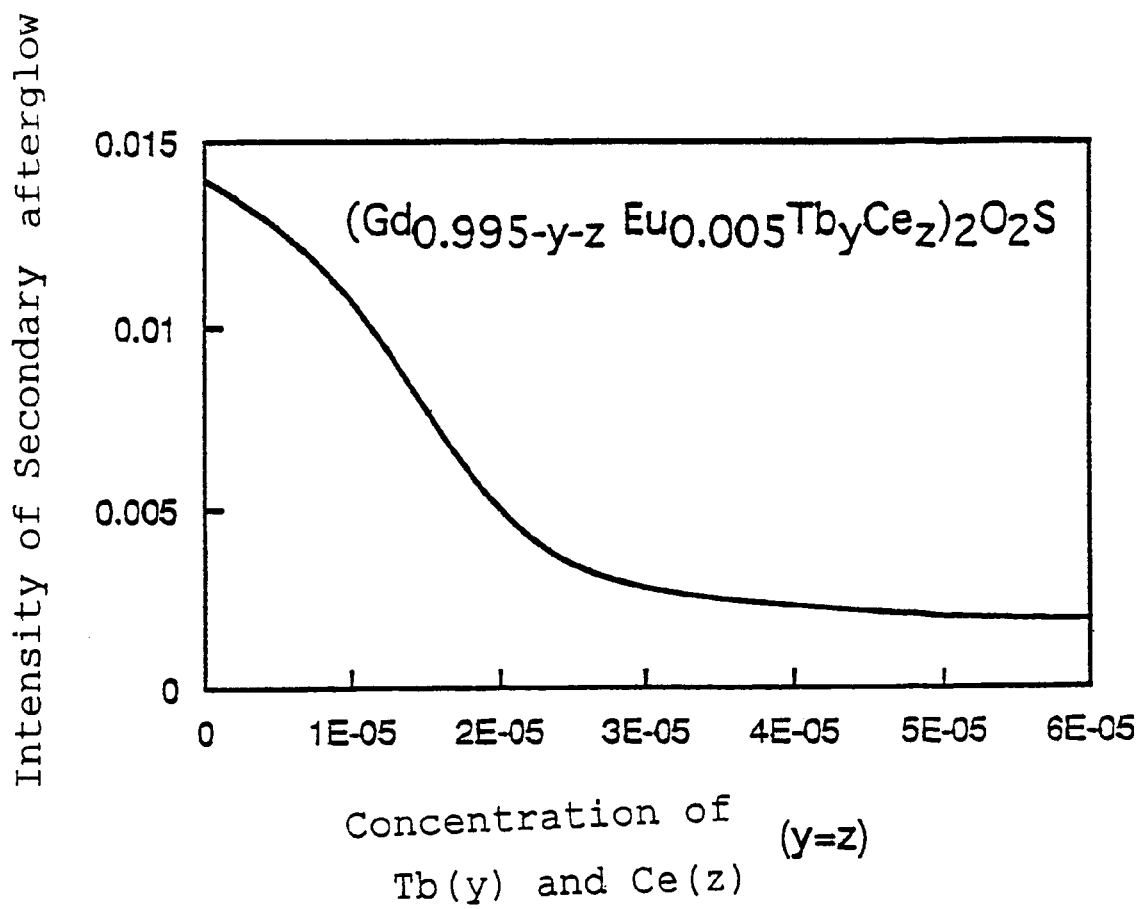
FIG. 4 is a graph showing how detector secondary afterglow intensity varies with Tb concentration (y) and Ce concentration (z) in a $(Gd_{0.995-y-z}Eu_{0.005}Tb_yCe_z)_2O_2S$ phosphor of the present invention.

$Gd_{2(1-x-y-z)}O_2S:Eu_x$, $Tb_y$, $Ce_z$ (x=0.005) ceramic scintillators with different Tb and Ce concentrations were produced by using the same raw materials as used in Example 1 in the same manner as in Example 1 except that the addition amounts of $Tb(NO_3)_3$ and $Ce(NO_3)_3$ were changed. A detector was produced by using each scintillator together with a photodiode, and secondary afterglow intensity at 30 milliseconds after the cessation of X-ray excitation was measured. The results are shown in FIG. 4. In FIG. 4, the axis of abscissa represents Tb and Ce concentrations (y=z), and the axis of ordinate represents the secondary afterglow intensity after 30 milliseconds. The secondary afterglow intensity was represented with relative values based on the intensity during the excitation defined to be 1 (the same shall be applied hereinafter).

As seen from the results shown in FIG. 4, the secondary afterglow could be significantly lowered. There was observed a tendency that the luminous output was lowered as the Tb concentration (y) and Ce concentration (z) increased, and luminous output twice or more than that of the $CdWO_4$ detector could be obtained by using Tb concentration (y) and Ce concentration (z) of $12\times10^{-5}$ or less.

Example 3

The secondary afterglow intensity (after 30 milliseconds) of ceramic scintillators with different Tb and Ce concentrations (y=z) was measured in the same manner as in Example 2 except that the Eu concentration (x) was set to be 0.03. The results are shown in FIG. 5.

Figure 5:
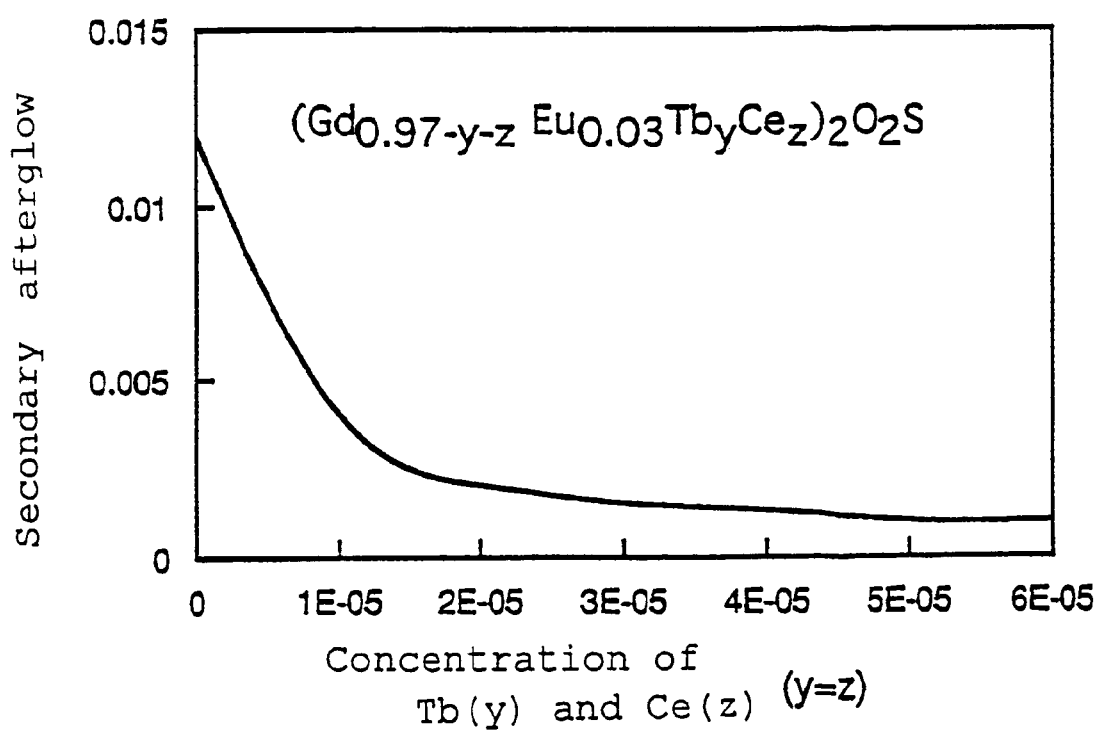
FIG. 5 is a graph showing how detector secondary afterglow intensity varies with Tb concentration (y) and Ce concentration (z) in a $(Gd_{0.97-y-z}Eu_{0.03}Tb_yCe_z)_2O_2S$ phosphor of the present invention.

As shown in FIG. 5, the secondary afterglow intensity of the scintillators of having a high Eu concentration (x=0.03) could be also lowered by adding Tb and Ce. Moreover, as clearly seen from comparison with the results of Example 2, it was found that, when the Eu concentration was high, strong secondary afterglow lowering effect could be obtained even with smaller addition amounts of Tb and Ce.

Comparative Examples 1 and 2

Figure 6:
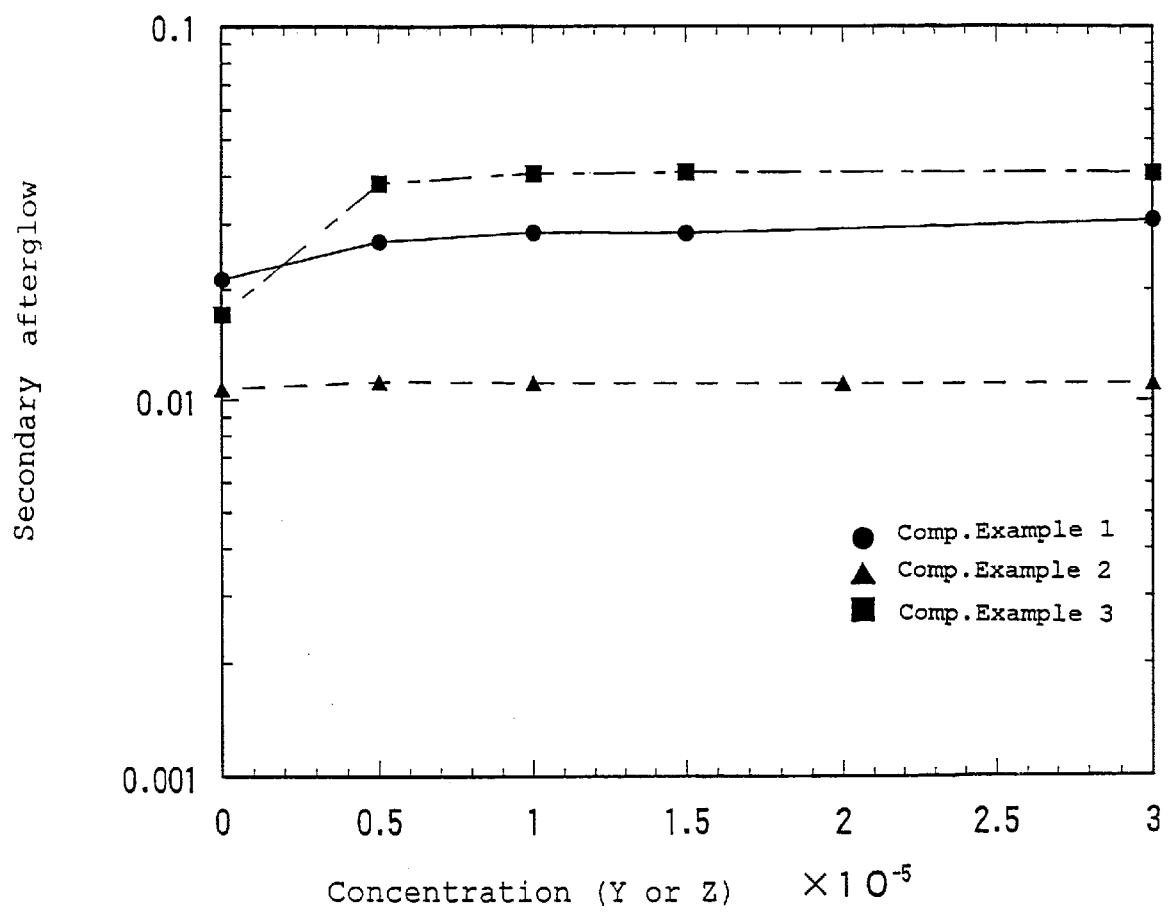
FIG. 6 is a graph showing how detector secondary afterglow intensity varies with Tb concentration (y) Pr concentration (y) or Ce concentration (z) in phosphors of comparative examples.

Ceramic scintillators containing either of Tb and Ce with different Tb concentrations or Ce concentrations were produced in the same manner as in Example 2. A detector was produced by using each scintillator together with a photodiode, and secondary afterglow intensity at 30 milliseconds after the cessation of X-ray excitation was measured. The results are shown in FIG. 6. In this figure, the solid line represents the results for the scintillators containing only Tb (Comparative Example 1), and the broken line represents the results for those containing only Ce (Comparative Example 2).

As seen from the results shown in FIG. 6, the secondary afterglow lowering effect could not be obtained at all by addition of either of Tb and Ce. When only Tb was added, there was observed even a tendency that the secondary afterglow increased as the Tb concentration increased.

Example 4

$Gd_2O_3$, $Eu_2O_3$, $Pr(NO_3)_3$, $Ce(NO_3)_3$, $Na_2CO_3$ and S were used as raw materials, and they were added flux components, $K_3PO_4 \cdot 3H_2O$ and $Li_2B_4O_7$, and treated in the same manner as in Example 1 to prepare scintillator powder. This scintillator powder was added 0.1% of $Li_2GeF_6$ as a sintering agent, and subjected to HIP treatment and then annealing treatment in the same manner as in Example 1 to produce $Gd_{2(1-x-y-z)}O_2S:Eu_x, Pr_y, Ce_z$ (x=0.005, y=z=$4\times10^{-5}$) ceramic scintillator. A detector was produced by using the scintillator, and its properties were examined in the same manner as in Example 1. Luminous output of the detector was 2.85 times as large as that of the $CdWO_4$ detector, and secondary afterglow after 30 milliseconds was 0.0017.

Comparative Example 3

$Gd_{2(1-x-y-z)}O_2S:Eu_x, Pr_y$ (x=0.005, y=$0.5\times10^{-5}$ to $3\times10^{-5}$) ceramic scintillators containing only Pr and not containing Ce was produced in the same manner as in Example 4. A detector was produced by using each scintillator together with a photodiode, and secondary afterglow intensity at 30 milliseconds after the cessation of X-ray excitation was measured. The results are shown in FIG. 6 (alternate long and short dash line).

As seen from the results shown in FIG. 6, the secondary afterglow lowering effect could not be obtained at all when only Pr was added, like in the cases where either of Tb and Ce was added (Comparative Examples 1 and 2).

Example 5

$Gd_2O_3$, $La_2O_3$, $Eu_2O_3$, $Tb(NO_3)_3$, $Ce(NO_3)_3$, $Na_2CO_3$ and S were used as raw materials, and they were added flux components, $K_3PO_4 \cdot 3H_2O$ and $Li_2B_4O_7$, and treated in the same manner as in Example 1 to prepare scintillator powder. This scintillator powder was added 0.1% of $Li_2GeF_6$ as a sintering agent, and subjected to HIP treatment and then annealing treatment in the same manner as in Example 1 to produce $Gd_{2(0.90-x-y-z)}La_{0.2}O_2S:Eu_x, Tb_y, Ce_z$ (x=0.005, y=z=$4\times10^{-5}$) ceramic scintillator. A detector was produced by using the scintillator, and its properties were examined in the same manner as in Example 1. Luminous output of the detector was 2.8 times as large as that of the $CdWO_4$ detector, and secondary afterglow after 30 milliseconds was 0.0016.

Example 6

$Gd_2O_3$, $Y_2O_3$, $Eu_2O_3$, $Tb(NO_3)_3$, $Ce(NO_3)_3$, $Na_2CO_3$ and S were used as raw materials, and they were added flux components, $K_3PO_4 \cdot 3H_2O$ and $Li_2B_4O_7$, and treated in the same manner as in Example 1 to prepare scintillator powder. This scintillator powder was added 0.1% of $Li_2GeF_6$ as a sintering agent, and subjected to HIP treatment and then annealing treatment in the same manner as in Example 1 to produce $Gd_{2(0.90-x-y-z)}Y_{0.2}O_2S:Eu_x, Tb_y, Ce_z$ (x=0.005, y=z=$4\times10^{-5}$) ceramic scintillator. A detector was produced by using the scintillator, and its properties were examined in the same manner as in Example 1. Luminous output of the detector was 2.83 times as large as that of the $CdWO_4$ detector, and secondary afterglow after 30 milliseconds was 0.0017.

Example 7

Figure 7:
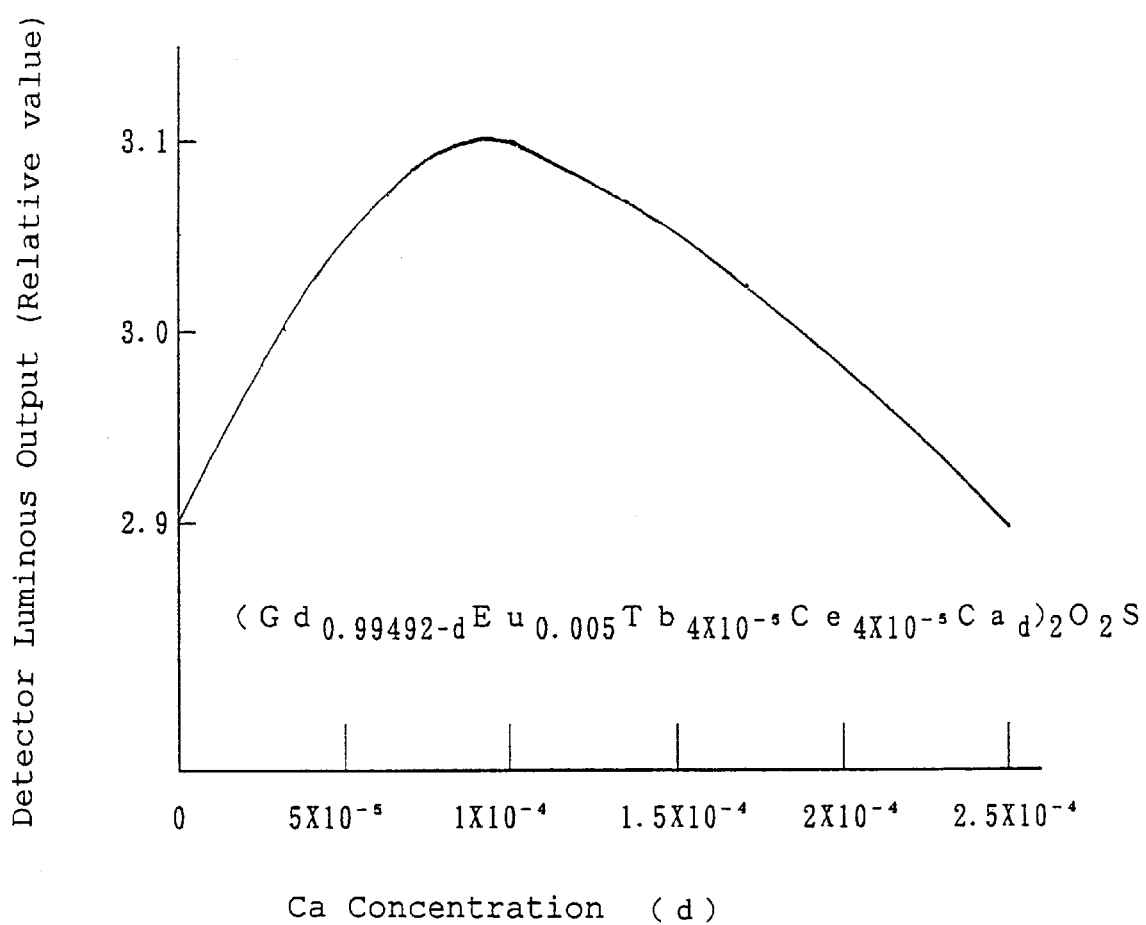
FIG. 7 is a graph showing how detector luminous output varies with Ca concentration (d) in a $(Gd_{0.995-y-z-d}Eu_{0.005}Tb_yCe_zCa_d)_2O_2S$ (y=z=4×10$^{-5}$) phosphor of the present invention.

$Gd_2O_3$, $Eu_2O_3$, $Tb(NO_3)_3$, $Ce(NO_3)_3$, S and $Ca_2(NO_3)_2$ were used as raw materials, and treated in the same manner as in Example 1 to prepare $Gd_{2(1-x-y-z-d)}O_2S:Eu_x, Tb_y, Ce_z, Ca_d$ (x=0.005, y=z=$4\times10^{-5}$) ceramic scintillators with different Ca concentrations (d). A detector was produced by using each scintillator together with a photodiode, and its luminous output was measured. The results are shown in FIG. 7.

The luminous output was represented with relative values based on the luminous output of the $CdWO_4$ detector defined to be 1. It was found that, when the Eu concentration x was 0.005, the maximum luminous output was obtained with a Ca concentration d of around $9\times10^{-5}$, and the luminous output became lower than that obtained without Ca, when d exceeded $2.5\times10^{-4}$.

The results of Example 1 and Examples 4–7 are summarized in Table 1.

TABLE 1

| | $(LEu_xM_yCe_zM'_d)_2O_2S$: Eu = 0.05 Ce = 4 × 10$^{-5}$ | | | Luminous output | |
|---|---|---|---|---|---|
| | L (1-x-y-z-d) | M (4 × 10$^{-5}$) | M' (9 × 10$^{-5}$) | (relative to CdWO$_4$) | Afterglow (30 ms) |
| Example 1 | Gd | Tb | — | 2.90 | 0.0015 |
| Example 4 | Gd | Pr | — | 2.85 | 0.0017 |
| Example 5 | Gd · La(0.1) | Tb | — | 2.8 | 0.0016 |
| Example 6 | Gd · Y(0.1) | Tb | — | 2.83 | 0.0017 |
| Example 7 | Gd | Tb | Ca | 3.10 | 0.0018 |

INDUSTRIAL APPLICABILITY

According to the present invention, there is provided a phosphor having a composition of $(L_{1-x-y-z-d}Eu_xM_yCe_zM'_d)_2O_2S$ and showing high emission efficiency and very short afterglow. According to the present invention, there is also provided a sintered body having the aforementioned composition and high optical transmittance. A radiation detector comprising this sintered body in combination with a silicon photodiode advantageously shows markedly increased luminous output compared with a conventional detector, and marked effect for shortening the secondary afterglow.

Furthermore, by using a detector utilizing such a scintillator as an x-ray detector of x-ray CT apparatus, tomographic images of high-resolution and high-quality can be obtained.

What is claimed is:

1. A phosphor represented by the general formula $$(L_{1-x-y-z-d}Eu_xM_yCe_zM'_d)_2O_2S$$

wherein L is at least one element selected from the group consisting of Gd, La and Y, M is at least one element selected from the group consisting of Tb and Pr, M' is at least one element selected from the group consisting of Ca, Sr and Zn, and x, y, z and d are values falling in the ranges of $0.001 \leq x \leq 0.06$, $0 < y \leq 12 \times 10^{-5}$, $0 < z \leq 12 \times 10^{-5}$, and $0 \leq d \leq 2.5 \times 10^{-4}$.

2. A phosphor obtained by adding a sintering agent to the starting material powder, packing and vacuum-sealing the mixture in a metal container and effecting hot isostatic pressing, and represented by the general formula $$(L_{1-x-y-z-d}Eu_xM_yCe_zM'_d)_2O_2S$$

wherein L is at least one element selected from the group consisting of Gd, La and Y, M is at least one element selected from the group consisting of Tb and Pr, M' is at least one element selected from the group consisting of Ca, Sr and Zn, and x, y, z and d are values falling in the ranges of $0.001 \leq x \leq 0.06$, $0 < y \leq 12 \times 10^{-5}$, $0 < z \leq 12 \times 10^{-5}$, and $0 \leq d \leq 2.5 \times 10^{-4}$.

3. The phosphor of claim 1, wherein M' in the formula is Ca.

4. The phosphor of claim 1, wherein L in the formula is Gd.

5. The phosphor of claim 1, wherein x of the formula is in the range of $0.002 \leq x \leq 0.03$.

6. The phosphor of claim 1, wherein d of the formula is in the range of $0 < d \leq 2.5 \times 10^{-4}$.

7. The phosphor of claim 6, wherein M' in the formula is Ca.

8. The phosphor of claim 7, wherein d is in the range of $3.0 \times 10^{-5} \leq d \leq 2.0 \times 10^{-4}$.

9. A method for producing the phosphor represented by the general formula $$(L_{1-x-y-z-d}Eu_xM_yCe_zM'_d)_2O_2S$$

wherein L is at least one element selected from the group consisting of Gd, La and Y, M is at least one element selected from the group consisting of Tb and Pr, M' is at least one element selected from the group consisting of Ca, Sr and Zn, and x, y, z and d are values falling in the ranges of $0.001 \leq x \leq 0.06$, $0 < y \leq 12 \times 10^{-5}$, $0 < z \leq 12 \times 10^{-5}$, and $0 \leq d \leq 2.5 \times 10^{-4}$;

which method comprises the steps of adding a sintering agent to the starting material powder, packing and vacuum-sealing the mixture in a metal container, and effecting hot isostatic pressing.

10. The method of claim 9, wherein the starting material is obtained by preparing a mixture including oxides or nitrates of elements constituting the phosphor in a stoichiometric ratio and baking the mixture.

11. The method of claim 9, wherein the steps further comprises annealing after the hot isostatic pressing, wherein annealing is conducted in an inert gas atmosphere containing a small amount of oxygen.

12. A radiation detector comprises a ceramic scintillator and a photodetector for detecting scintillator emission, wherein the phosphor of any one of claims 1–8 is used as the ceramic scintillator.

13. The radiation detector of claim 12, wherein the photodetector is a photodiode.

14. The radiation detector of claim 13, wherein the photodetector is a PIN photodiode.

15. An X-ray CT apparatus comprising an X-ray source, an X-ray detector disposed facing the X-ray source, a revolving unit for holding the X-ray source and the X-ray detector and revolving them about the object to be examined, and image reconstruction means for reconstructing a tomographic image of the object based on the intensity of the X-rays detected by the X-ray detector, wherein the X-ray detector is a radiation detector of any one of claims 12–14.

* * * * *